United States Patent
Lee et al.

(10) Patent No.: US 9,955,508 B2
(45) Date of Patent: Apr. 24, 2018

(54) METHOD AND APPARATUS FOR PERFORMING RANDOM ACCESS PROCEDURE FOR COVERAGE ENHANCEMENT USER EQUIPMENTS IN WIRELESS COMMUNICATION SYSTEM

(71) Applicant: LG ELECTRONICS INC., Seoul (KR)

(72) Inventors: Jaewook Lee, Seoul (KR); Sungjun Park, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 15/034,644

(22) PCT Filed: Dec. 1, 2014

(86) PCT No.: PCT/KR2014/011605
§ 371 (c)(1),
(2) Date: May 5, 2016

(87) PCT Pub. No.: WO2015/083994
PCT Pub. Date: Jun. 11, 2015

(65) Prior Publication Data
US 2016/0262186 A1    Sep. 8, 2016

Related U.S. Application Data (60) Provisional application No. 61/911,968, filed on Dec. 4, 2013.

(51) Int. Cl.
*H04W 74/08* (2009.01)
*H04L 1/00* (2006.01)
(Continued)

(52) U.S. Cl.
CPC .......... *H04W 74/0833* (2013.01); *H04L 1/00* (2013.01); *H04W 4/005* (2013.01); *H04W 16/26* (2013.01);
(Continued)

(58) Field of Classification Search
None
See application file for complete search history.

(56) References Cited

U.S. PATENT DOCUMENTS 9,210,711 B2* 12/2015 Wiberg ............... H04W 74/006
9,668,280 B2*  5/2017 Wu ................... H04W 74/0833
(Continued)

OTHER PUBLICATIONS

Huawei, Hisilicon, "6.2.2.2.2 Determining the repetition level during initial random access and non-initial random access", 3GPP TSG RAN WG1 Meeting #75, R1-135382, Nov. 11-15, 2013, San Francisco, USA.
(Continued)

*Primary Examiner* — Hong Cho
(74) *Attorney, Agent, or Firm* — Birch, Stewart, Kolasch & Birch, LLP (57) ABSTRACT

A method and apparatus for performing a random access procedure in a wireless communication system is provided. In one embodiment, a user equipment (UE) determines a required amount of repetitions for uplink transmissions during a random access procedure, and performs repetitions for uplink transmissions based on the determined required amount of repetitions for uplink transmissions. The uplink transmissions may include transmission of preambles which are grouped. In another embodiment, a UE configures a communication windows for lost-cost machine-type communication (MTC) UE, and performs a random access procedure through the configured communication window.

8 Claims, 6 Drawing Sheets

(51) Int. Cl.
  *H04W 4/00*  (2009.01)
  *H04W 16/26* (2009.01)
  *H04W 74/00* (2009.01)
  *H04W 88/06* (2009.01)
  *H04W 88/16* (2009.01)

(52) U.S. Cl.
  CPC ....... *H04W 74/004* (2013.01); *H04W 74/006* (2013.01); *H04W 88/06* (2013.01); *H04W 88/16* (2013.01)

(56) References Cited

U.S. PATENT DOCUMENTS

| | | | |
|---|---|---|---|
| 2004/0066838 A1* | 4/2004 | Choi | H04L 1/0003 375/146 |
| 2006/0018289 A1* | 1/2006 | Schulist | H04W 52/50 370/335 |
| 2009/0316593 A1* | 12/2009 | Wang | H04W 74/0833 370/252 |
| 2010/0208597 A1 | 8/2010 | Chun et al. | |
| 2010/0331003 A1 | 12/2010 | Park et al. | |
| 2011/0292816 A1 | 12/2011 | Lee et al. | |
| 2013/0272220 A1* | 10/2013 | Li | H04W 72/046 370/329 |
| 2015/0057011 A1* | 2/2015 | Di Girolamo | H04W 74/0808 455/454 |
| 2015/0078264 A1* | 3/2015 | Han | H04W 74/0833 370/329 |
| 2015/0117374 A1* | 4/2015 | Wu | H04W 74/0833 370/329 |

OTHER PUBLICATIONS

LG Electronics, 6.2.2.2.1 Evaluation on PBCH repetition for MTC coverage enhancement, 3GPP TSG RAN WG1 Meeting #75, R1-135459, Nov. 11-15, 2013, San Francisco, USA.

Alcatel-Lucent et al., "Coverage Enhancement Techniques for PRACH," 3GPP TSG-RAN WG1 Meeting #74bis, R1-134208, Guangzhou, China, Oct. 7-11, 2013, 3 pages Alcatel-Lucent et al., "PRACH Coverage Enhancement for MTC UE," 3GPP TSG-RAN WG1 Meeting #75, R1-135155, San Francisco, USA, Nov. 11-15, 2013, 8 pages.

Intel Corporation, "Coverage Enhancement of PRACH for Low Cost MTC," 3GPP TSG RAN WG1 Meeting #75, R1-135104, San Francisco, USA, Nov. 11-15, 2013, pp. 1-8.

Mediatek Inc., "Discussion on PRACH and RACH Procedure in Coverage Enhancement Mode," 3GPP TSG-RAN WG1 #75, R1-135424, San Francisco, USA, Nov. 11-15, 2013, 5 pages.

Sharp, "PRACH Coverage Enhancement for MTC UE," 3GPP TSG RAN WG1 Meeting #74bis, R1-134472, Guangzhou, China, Oct. 7-11, 2013, pp. 1-4.

* cited by examiner

METHOD AND APPARATUS FOR PERFORMING RANDOM ACCESS PROCEDURE FOR COVERAGE ENHANCEMENT USER EQUIPMENTS IN WIRELESS COMMUNICATION SYSTEM

CROSS REFERENCE TO RELATED APPLICATIONS

This application is the National Phase of PCT International Application No. PCT/KR2014/011605, filed on Dec. 1, 2014, which claims priority under 35 U.S.C. 119(e) to U.S. Provisional Application No. 61/911,968, filed on Dec. 4, 2013, all of which are hereby expressly incorporated by reference into the present application.

TECHNICAL FIELD

The present invention relates to wireless communications, and more particularly, to a method and apparatus for performing a random access procedure for coverage enhancement user equipments (UEs) in a wireless communication system.

BACKGROUND ART

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Machine-type communication (MTC) is an important revenue stream for operators and has a huge potential from the operator perspective. There are several industry for a working on an efficient machine-to-machine (M2M) system with some industry members developing a new access technology dedicated for MTC. However, it is more efficient for operators to be able to serve MTC user equipment (UE) using already deployed radio access technology. Therefore it is important for operators to understand whether LTE could be a competitive radio access technology for efficient support of MTC. It is envisaged that MTC UE's will be deployed in huge numbers, large enough to create an ecosystem on its own. Lowering the cost of MTC UE's is an important enabler for implementation of the concept of "internet of things". MTC UE's used for many applications will require low operational power consumption and are expected to communicate with infrequent small burst transmissions.

In addition, there is a substantial market for the use cases of devices deployed deep inside buildings which would require coverage enhancement in comparison to the defined LTE cell coverage footprint. Various methods have been discussed for coverage enhancement for MTC UEs.

SUMMARY OF INVENTION

Technical Problem

The present invention provides a method and apparatus for performing a random access procedure for coverage enhancement user equipments (UEs). The present invention provides a method for performing repetitions for uplink transmissions based on a determined required amount of repetitions for uplink transmissions. The present invention provides a method for performing a random access procedure through a newly defined communication window.

Solution to Problem

In an aspect, a method for performing, by a user equipment (UE), a random access procedure in a wireless communication system is provided. The method includes determining a required amount of repetitions for uplink transmissions during a random access procedure, and performing repetitions for uplink transmissions based on the determined required amount of repetitions for uplink transmissions.

In another aspect, a user equipment (UE) in a wireless communication system is provided. The UE includes a radio frequency (RF) unit for transmitting or receiving a radio signal, and a processor coupled to the RF unit, and configured to determine a required amount of repetitions for uplink transmissions during a random access procedure, and perform repetitions for uplink transmissions based on the determined required amount of repetitions for uplink transmissions.

In another aspect, a method for performing, by a user equipment (UE), a random access procedure in a wireless communication system is provided. The method includes configuring a communication windows for lost-cost machine-type communication (MTC) UE, and performing a random access procedure through the configured communication window.

Advantageous Effects of Invention

Coverage enhancement for MTC UEs can be performed efficiently.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

Figure 1:
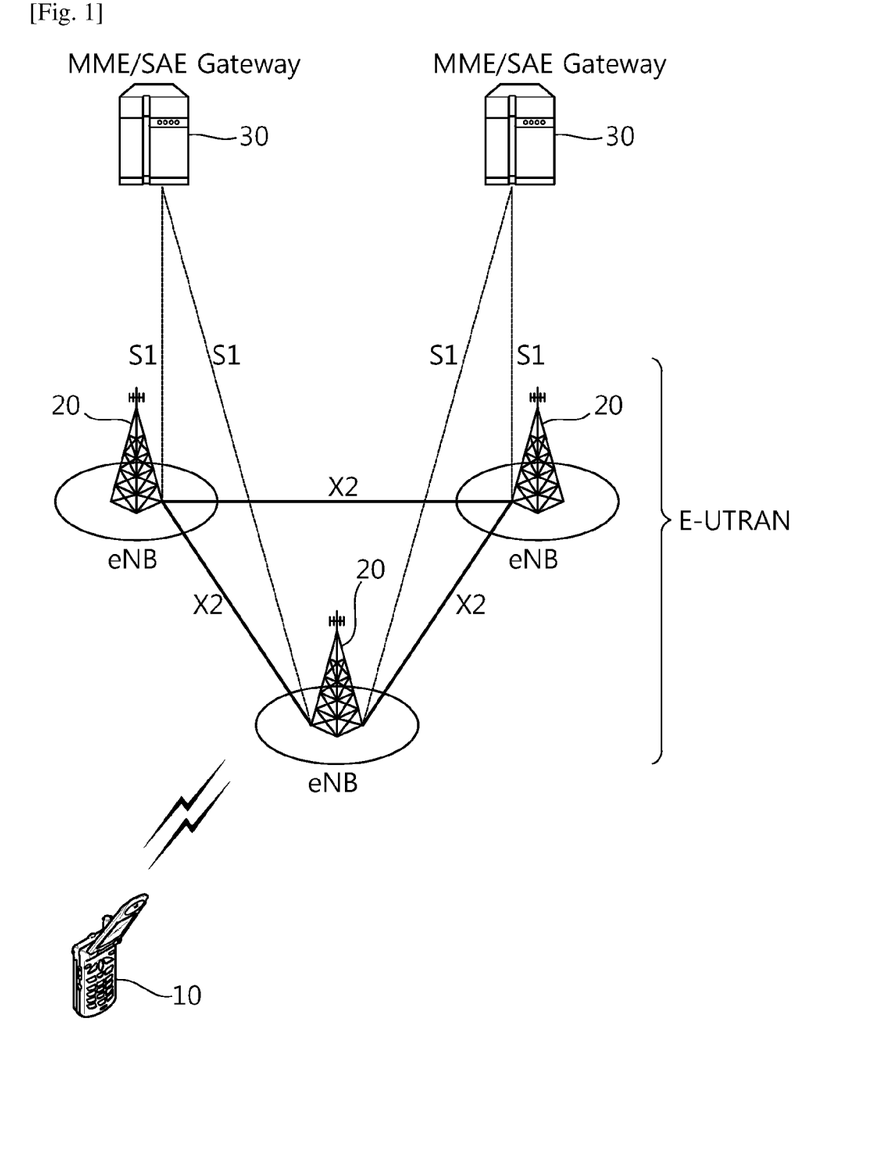
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

Figure 2:
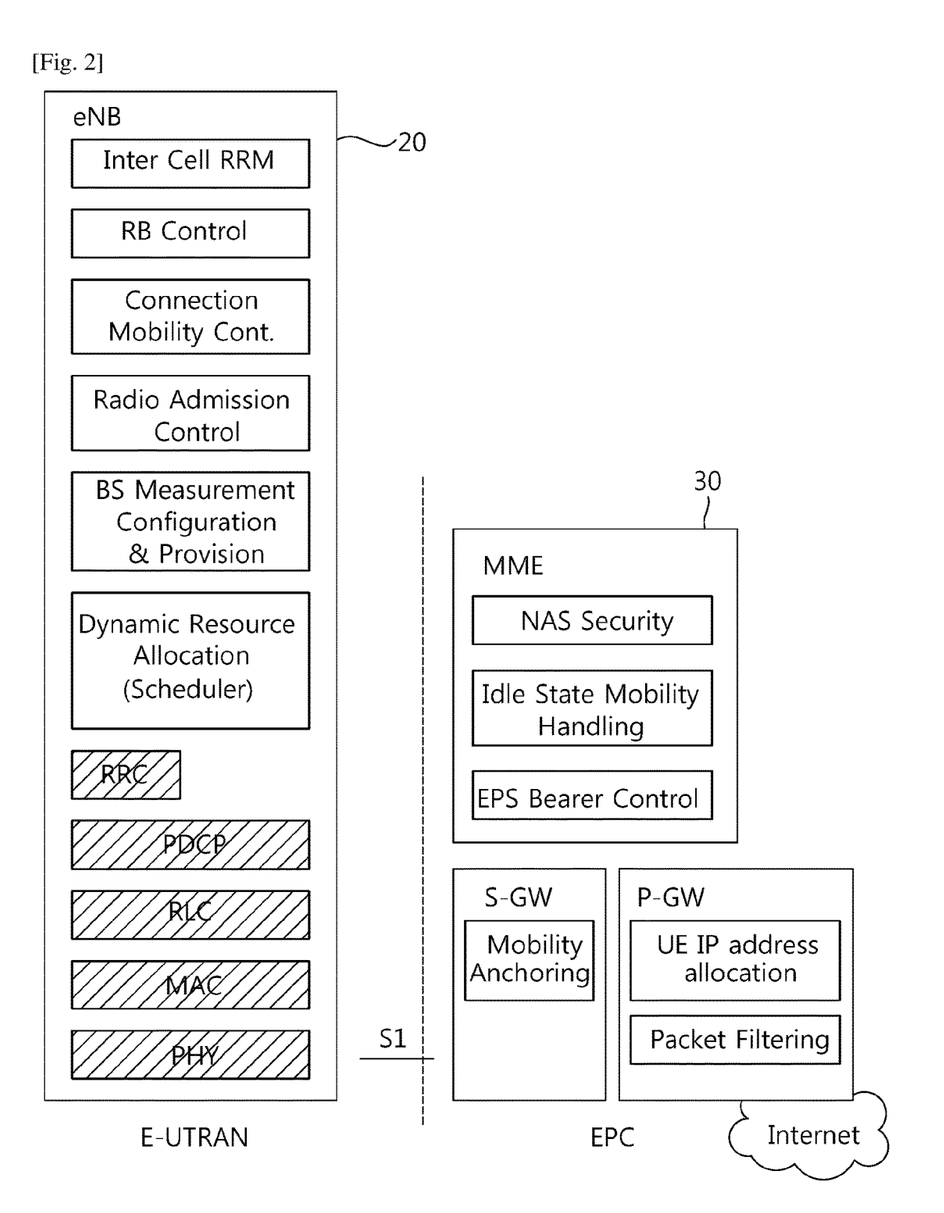
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
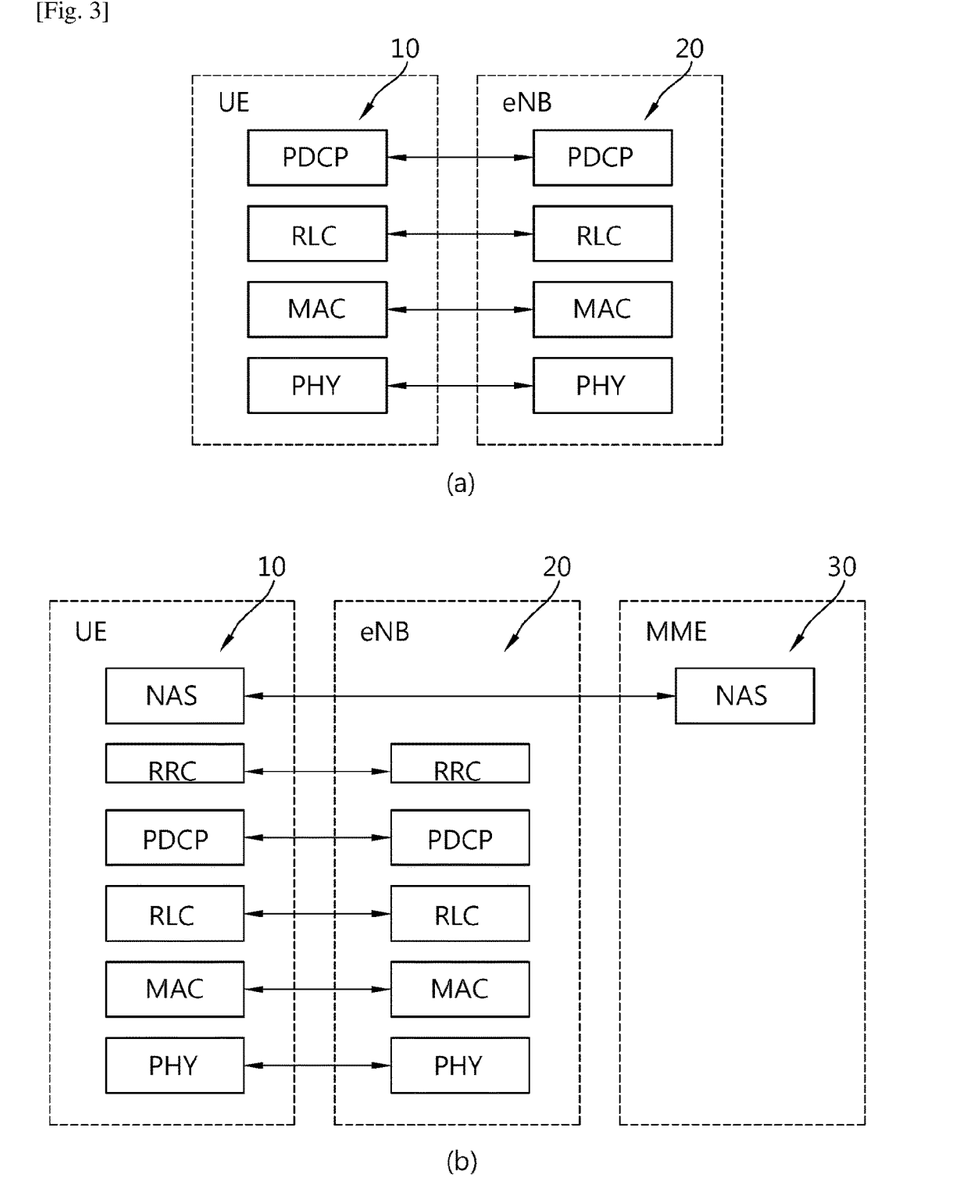
FIG. 3 shows a block diagram of a user plane protocol stack and a control plane protocol stack of an LTE system.

FIG. 3 shows a block diagram of a user plane protocol stack and a control plane protocol stack of an LTE system.

FIG. 3-(a) shows a block diagram of a user plane protocol stack of an LTE system, and FIG. 3-(b) shows a block diagram of a control plane protocol stack of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
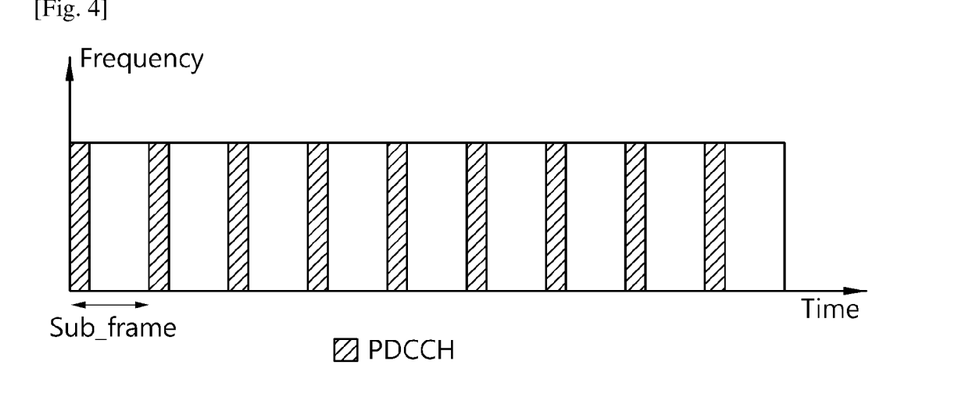
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3-(a), the RLC and MAC layers (terminated in the eNB on the network side) may perform functions such as scheduling, automatic repeat request (ARQ), and hybrid automatic repeat request (HARQ). The PDCP layer (terminated in the eNB on the network side) may perform the user plane functions such as header compression, integrity protection, and ciphering.

Referring to FIG. 3-(b), the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

Random access (RA) procedure is described. It may be referred to Section 10.1.5 of 3GPP TS 36.300 V11.6.0 (2013-06).

The random access procedure is characterized by:
Common procedure for FDD and TDD;
One procedure irrespective of cell size and the number of serving cells when carrier aggregation (CA) is configured.

The random access procedure is performed for the following events related to the primary cell (PCell):
Initial access from RRC_IDLE;
RRC connection re-establishment procedure;
Handover;
DL data arrival during RRC_CONNECTED requiring random access procedure (e.g., when UL synchronization status is "non-synchronized");
UL data arrival during RRC_CONNECTED requiring random access procedure (e.g., when UL synchronization status is "non-synchronized" or there are no PUCCH resources for scheduling request (SR) available);
For positioning purpose during RRC_CONNECTED requiring random access procedure (e.g., when timing advance is needed for UE positioning);
The random access procedure is also performed on a SCell to establish time alignment for the corresponding secondary TAG (sTAG).

Furthermore, the random access procedure takes two distinct forms:
Contention based (applicable to first five events);
Non-contention based (applicable to only handover, DL data arrival, positioning and obtaining timing advance alignment for a sTAG).

Normal DL/UL transmission can take place after the random access procedure.

Figure 5:
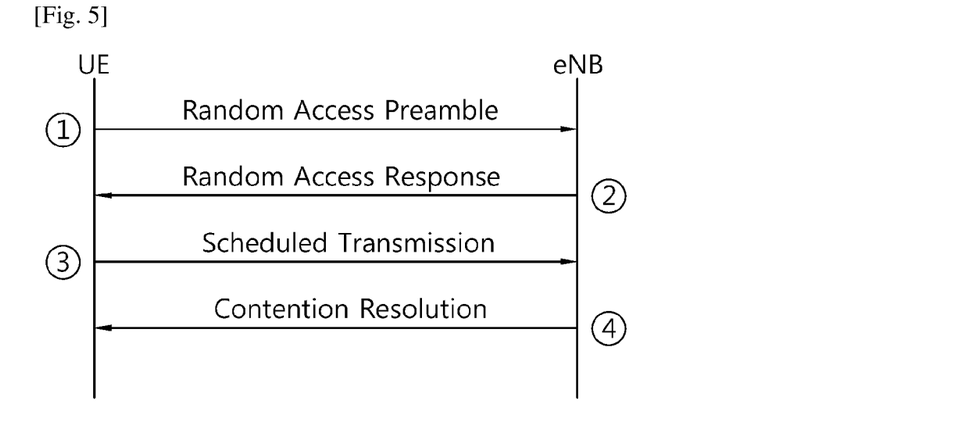
FIG. 5 shows a contention based random access procedure.

FIG. 5 shows a contention based random access procedure.

The four steps of the contention based random access procedures are:

1) Random access preamble on RACH in uplink (message 1): There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds is broadcast on system information.

2) Random access response generated by MAC on DL-SCH (message 2): The message 2 may be semi-synchronous (within a flexible window of which the size is one or more TTI) with message 1. The message 2 may not use HARQ. The message 2 may be addressed to random access radio network temporary identity (RA-RNTI) on PDCCH. The message 2 may convey at least RA-preamble identifier, timing alignment information for the primary timing advance group (pTAG), initial UL grant and assignment of temporary cell RNTI (C-RNTI) (which may or may not be made permanent upon contention resolution). The message 2 may be intended for a variable number of UEs in one DL-SCH message.

3) First scheduled UL transmission on UL-SCH (message 3): The message 3 may use HARQ. Size of the transport blocks depends on the UL grant conveyed in step 2 and is at least 80 bits. For initial access, the message 3 may convey the RRC Connection Request generated by the RRC layer and transmitted via CCCH, or may convey at least NAS UE identifier but no NAS message. For RRC connection re-establishment procedure, the message 3 may convey the RRC connection re-establishment request generated by the RRC layer and transmitted via CCCH, and may not contain any NAS message. After handover, in the target cell, the message 3 may convey the ciphered and integrity protected RRC handover confirm generated by the RRC layer and transmitted via DCCH, or may convey the C-RNTI of the UE (which was allocated via the handover command). The message 3 may include an uplink buffer status report when possible. For other events, the message 3 may convey at least the C-RNTI of the UE.

4) Contention resolution on DL (message 4): Early contention resolution shall be used, i.e., eNB does not wait for NAS reply before resolving contention. The message 4 may be not synchronized with message 3. HARQ is supported. The message 4 may be addressed to the temporary C-RNTI on PDCCH for initial access and after radio link failure, and/or the C-RNTI on PDCCH for UE in RRC_CONNECTED. HARQ feedback is transmitted only by the UE which detects its own UE identity, as provided in message 3, echoed in the contention resolution message.

The temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell.

Figure 6:
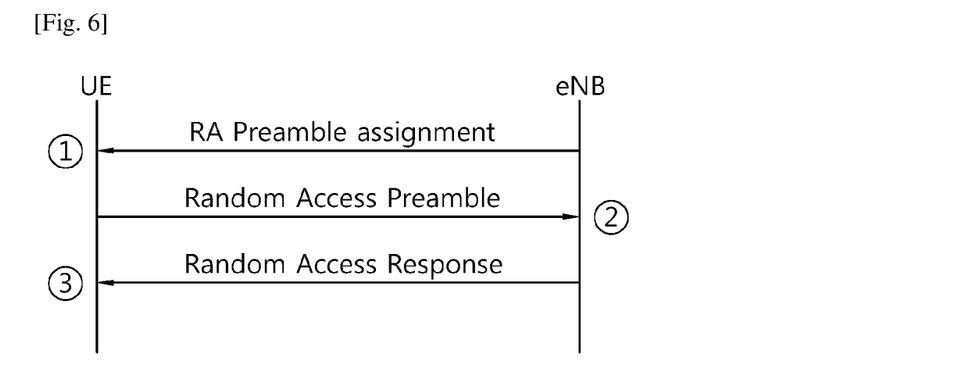
FIG. 6 shows a non-contention based random access procedure.

FIG. 6 shows a non-contention based random access procedure.

The three steps of the non-contention based random access procedures are:

0) Random access preamble assignment via dedicated signaling in DL: The eNB assigns to the UE a non-contention random access preamble (a random access preamble not within the set sent in broadcast signaling). The non-contention random access preamble may be signaled via HO command generated by target eNB and sent via source eNB for handover, or PDCCH in case of DL data arrival or positioning, or PDCCH for initial UL time alignment for a sTAG.

1) Random access preamble on RACH in uplink (message 1): The UE transmits the assigned non-contention random access preamble.

2) Random access response on DL-SCH (message 2): The message 2 may be semi-synchronous (within a flexible window of which the size is two or more TTIs) with message 1. The message 2 may not use HARQ. The message 2 may be addressed to RA-RNTI on PDCCH. The message 2 may convey at least timing alignment information and initial UL grant for handover, timing alignment information for DL data arrival, RA-preamble identifier. The message 2 may be intended for one or multiple UEs in one DL-SCH message.

When performing non-contention based random access on the PCell while CA is configured, the random access preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and random access response (step 2) takes place on PCell.

Low-cost machine-type communications (MTC) UEs are described. It may be referred to Section 5 of 3GPP TR 36.888 V12.0.0 (2013-06). Solutions studied for provisioning of low-cost MTC UE based on LTE should support below as a minimum requirement.

Support data rates equivalent to that supported by [R'99 E-GPRS] with an EGPRS multi-slot class 2 device (2 downlink timeslots (118.4 Kbps), 1 uplink timeslots (59.2 Kbps), and a maximum of 3 active timeslots) as a minimum. This does not preclude the support of higher data rates provided the cost targets are not compromised.

Enable significantly improved average spectrum efficiency for low data rate MTC traffic compared to that achieved for R99 GSM/EGPRS terminals in GSM/EGPRS networks today, and ideally comparable with that of LTE. Optimizations for low-cost MTC UEs should minimize impact on the spectrum efficiency achievable for other terminals (normal LTE terminals) in LTE Release 8-10 networks.

Ensure that service coverage footprint of low-cost MTC UE based on LTE is not any worse than the service coverage footprint of GSM/EGPRS MTC device (in an GSM/EGPRS network) or that of "normal LTE UEs" (in an LTE network) assuming on the same spectrum band.

Coverage improvement of 20 dB should be targeted for low-cost MTC UEs in comparison to defined LTE cell coverage footprint as engineered for "normal LTE UEs".

Ensure that overall power consumption is no worse than existing GSM/GPRS based MTC devices.

Ensure good radio frequency coexistence with legacy (Release 8-10) LTE radio interface and networks.

Target operation of low-cost MTC UEs and legacy LTE UEs on the same carrier.

Re-use the existing LTE/SAE network architecture.

Solutions should be specified in terms of changes to the Rel 10 version of the specifications The study item shall consider optimizations for both FDD and TDD mode.

The initial phase of the study shall focus on solutions that do not necessarily require changes to the LTE base station hardware.

Low-cost MTC device support limited mobility (i.e., no support of seamless handover; ability to operate in networks in different countries) and are low power consumption modules.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

The basic method for coverage enhancement may be repetition of each message. That is, effect of coverage enhancement can be required by repeating transmission of messages. The required extent of coverage enhancement for normal operation may be different for each MTC UE. In other words, each MTC UE may be required to perform the different number of repetitions for coverage enhancement. A farther MTC UE from the cell center may need more amount of repetitions while a near MTC UE may need less amount of repetitions. If the same amount of repetitions is performed for each MTC UE, unnecessary resource waste and power consumption may occur due to the unnecessary repetitions. Therefore, it is necessary to differentiate the amount of repetition for each MTC UE during random access for avoiding unnecessary repetition. Furthermore, since the network does not know the timing of repetitions for uplink transmissions of the MTC UE, a new communication window for MTC UEs may need to be defined.

Figure 7:
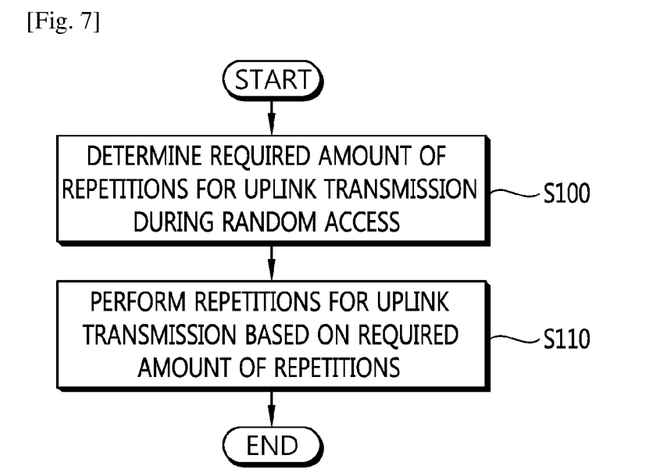
FIG. 7 shows an example of a method for performing a random access procedure according to an embodiment of the present invention.

FIG. 7 shows an example of a method for performing a random access procedure according to an embodiment of the present invention. In this embodiment, differentiation of the number of repetitions for each MTC UE and grouping of preambles are proposed for avoiding unnecessary repetition.

Referring to FIG. 7, in step S100, the UE determines a required amount of repetitions for uplink transmissions during a random access procedure. In order to differentiate the number of repetitions for uplink transmissions during the random access procedure, the UE may autonomously determines the required amount of repetitions for the uplink transmissions during the random access procedure. The required amount of repetitions for the uplink transmissions may be determined based on at least one of followings:

Alt. 1: the downlink channel condition (e.g., pathloss, reference signal received power (RSRP), reference signal received quality (RSRQ))

Alt. 2: the number of repetitions for correct reception of the downlink message (e.g., system information, paging) or Alt. 3: the amount of repetitions that was required for the latest uplink transmission For Alt. 1 or Alt. 2, described above, the network may provide a mapping table between the number of repetitions required for correct reception of the downlink message (or downlink pathloss) and an estimated number of repetitions for uplink transmissions to the UE. The mapping table may be provided from the network to the UE via dedicated/broadcast signaling. Alternatively, the mapping table may be specified in the specification. Table 1 shows an example of the mapping table between the estimated number of repetitions for uplink transmissions and the number of repetitions required for correct reception of the downlink message.

TABLE 1

| the number of repetitions required by the UE for the correct reception of the downlink message | the estimated number of uplink repetitions |
|---|---|
| 20 | 30 |
| 30 | 40 |
| 40 | 50 |
| ... | ... |

Referring to Table 1, for example, if the number of repetitions required by the UE for the correct reception of the downlink message is 20, the estimated number of uplink repetitions is 30. The UE may determine the required amount of repetitions for uplink transmissions based on the mapping table.

For Alt. 3 described above, the UE stores the number of repetitions required for the latest uplink transmission, if any.

Back to FIG. 7, in step S110, the UE performs repetitions for uplink transmissions based on the determined required amount of repetitions for uplink transmissions. If there is a need to transmit any uplink message including preambles, the UE may perform the repetitions for uplink transmissions as many as the required amount of repetitions determined from the mapping table, for Alt. 1 or Alt. 2, or as many as the stored number of repetitions required for the latest uplink transmission, for Alt. 3.

Further, in order to let the network know how many repetitions for uplink transmissions are required, the preambles, included in the uplink transmissions, may be grouped. The preambles may be grouped based on at least one of followings:

Alt. 1: the downlink channel condition (e.g., pathloss, RSRP, RSRQ)

Alt. 2: the number of repetitions for correct reception of the downlink message (e.g., system information, paging) or Alt. 3: the amount of repetitions that was required for the latest uplink transmission The grouping may be specified in the specification or configured by the network. After receiving the preambles which are grouped, the network may estimate the required number of repetitions for the uplink and downlink message.

Figure 8:
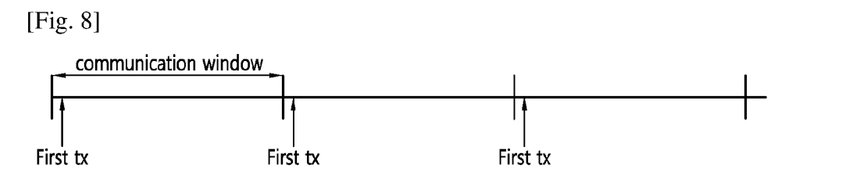
FIG. 8 shows an example of a communication window according to an embodiment of the present invention.

FIG. 8 shows an example of a communication window according to an embodiment of the present invention. Since the network does not know when the UE starts first repetition among the repetitions for the uplink message, the network may not combine the uplink message from the UE correctly. In order to resolve this problem, communication window may be defined.

Referring to FIG. 8, the first repetition among the repetitions for the uplink message is performed within the communication window. Within the communication window, the UE using coverage enhancement may be only allowed to repeat the same uplink message (including the random access preamble). Optionally, the UE may be only allowed to transmit the first repetition among the repetitions for the uplink message in designated subframes. For example, the first subframe in each communication window may be used for the first repetition among the repetitions for the uplink message. The size of the communication window size and/or the location of the designated subframes may be fixed or configured by the network via broadcast/dedicated signaling. The UE may try to decode the downlink response message (including ACK/NACK) in the next communication window after transmitting the uplink message in one communication window.

Figure 9:
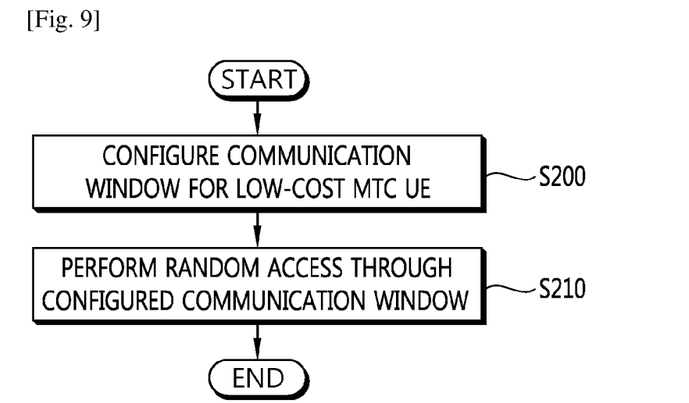
FIG. 9 shows another example of a method for performing a random access procedure according to an embodiment of the present invention.

FIG. 9 shows another example of a method for performing a random access procedure according to an embodiment of the present invention.

In step S200, the network configures a communication window for UEs required for coverage enhancement (e.g., lost-cost MTC UE at the cell edge). A size of the configured communication window may be fixed or configured by a network. The UE may be allowed to transmit repeat the same uplink message within the configured communication window.

In step S210, the UE performs a random access procedure through the configured communication window. That is, the UE may perform repetitions for uplink transmissions within the configured communication window. A first repetition among the repetitions for uplink transmissions may be performed in a designated subframe. The UE may randomly select the configured communication window for uplink transmission. For selecting the communication window randomly, the network may provide a boundary value in unit of the communication window via broadcast/dedicated signaling. After receiving the boundary value, the UE may select the communication window with equal probability within the boundary value. In case of random access procedure, the UE may adjust (i.e., add or multiply) the boundary value with a backoff value if the UE fails to transmit the uplink message. The backoff value may be provided by the network. The UE which fails uplink transmission may select the communication window within the adjusted boundary value.

The UE may monitor the PDCCH of the PCell for the downlink response message (e.g., random access response (s)) identified by the RNTI (e.g., new RA-RNTI for random access response), in the next communication window. If the UE fails to transmit the uplink message within selected communication window or the UE fails to receive the downlink response message, the UE may perform a backoff in unit of a communication window.

Figure 10:
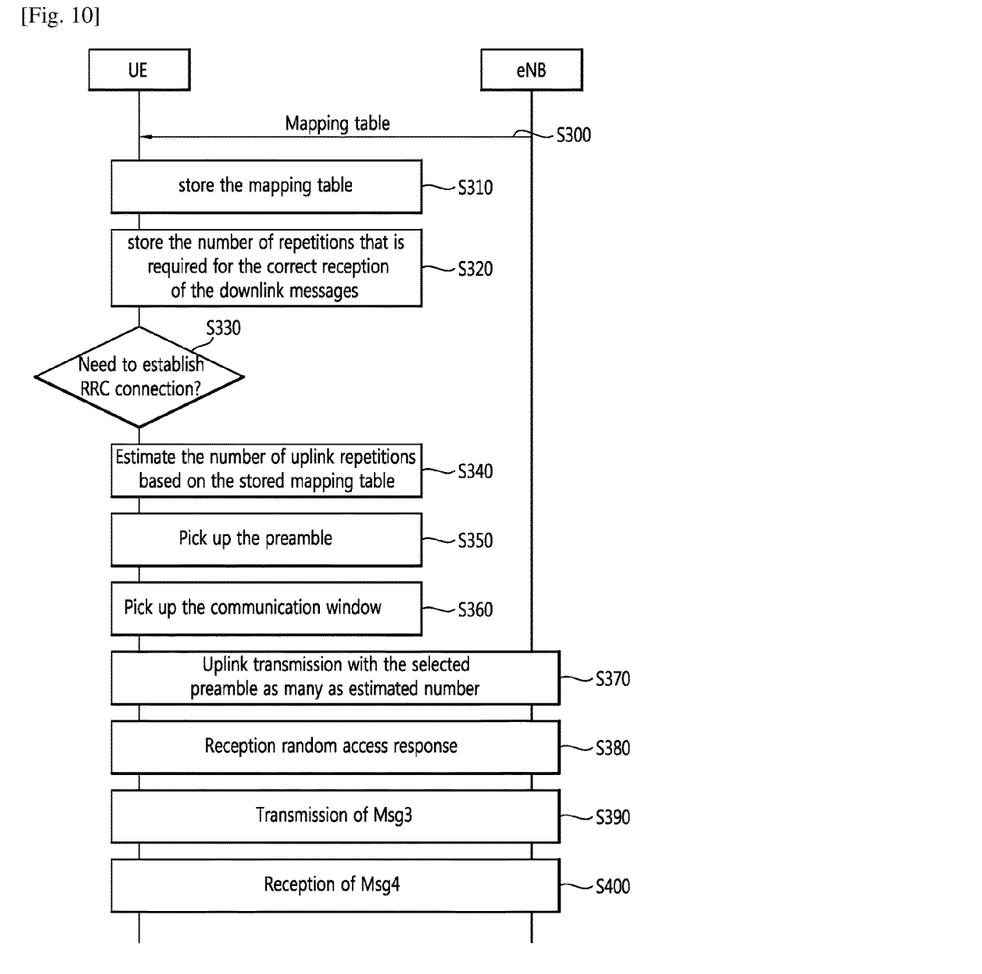
FIG. 10 shows another example of a method for performing a random access procedure according to an embodiment of the present invention.

FIG. 10 shows another example of a method for performing a random access procedure according to an embodiment of the present invention. In this embodiment, it is assumed that the UE determines the required amount of repetitions for uplink transmissions based on the number of repetitions required by the UE for the correct reception of the downlink message, i.e., Alt. 2. The downlink message may be any downlink message provided via dedicated/broadcast signaling.

In step S300, the network provides the mapping table between the estimated number of repetitions for uplink transmissions and the number of repetitions required by the UE for the correct reception of the downlink message to the UE via broadcast signaling. In step S310, the UE stores the received mapping table.

In step S320, the UE evaluates and stores the number of repetitions that is required for the correct reception of the downlink messages. Then, the UE calculates the number of repetitions that is required for the correct reception of the downlink messages during receiving broadcast signaling in step S300.

In step S330, when there is a need to establish RRC connection or needs to transmit the uplink message, in step S340, the UE estimates the number of repetitions for uplink transmissions based on the stored mapping table and the number of repetitions required for the correct reception of the downlink messages evaluated in step S320.

In step S350, the UE picks up the preamble based on the number of repetitions required for the correct reception of the downlink messages evaluated in Step S320. The UE selects the random access preamble group and then randomly selects a random access preamble within the selected random access preamble group.

In step S360, the UE autonomously selects the communication window in a random manner. In Step S370, within the selected communication window, the UE repeats transmissions of the selected random access preamble as many as the calculated number in Step S340.

In step S380, within the next communication window, the UE tries to decode the random access response with new RA-RNTI allocated for coverage enhancement UE. The response window for the random access response may start at the start of this communication window. The length of the response window may be aligned with the length of one or more communication window. The random access response may include the communication window where the UE is allowed to transmit the uplink message. The random access response may also include the required number of transmission for the uplink message.

If the UE successfully decodes the random access response within the communication window and the random access response contains a random access preamble identifier corresponding to the transmitted random access preamble, the UE may consider this random access response reception successful. However, for the following cases, the random access response reception may be considered unsuccessful.

If no random access response is received within the communication window (and/or response window), or If the random access response is not decoded until the end of the current communication window (and/or response window), or If the UE does not decode the random access response even if the UE receives the messages as many as the maximum number, or if none of all received random access responses contains the random access preamble identifier corresponding to the transmitted random access preamble In this case, the UE may select the communication window based on the backoff parameter provided by the network. And the UE may increase the number of repetitions for uplink transmissions. The increase in the number of repetitions for uplink transmissions may be fixed or configured by the network.

In step S390, if the UE considers this random access response reception successful, in the next communication window (or allocated communication window by the random access response), the UE repeats the message 3 as many as the number of repetitions required for successful preamble transmission (or, as many as the number of repetitions indicated by the random access response). After finishing repeating the message 3, the UE start mac-ContentionResolutionTimer. The mac-ContentionResolutionTimer alternatively may start at the start of the next communication window. The length of the timer may be aligned with the length of one or more communication window.

In step S400, in the next communication window, the UE tries to decode the message 4. For the following cases, the reception of the message 4 may be considered unsuccessful.

If mac-ContentionResolutionTimer expires, or

If the UE does not decode the message 4 until the end of the current communication window, or If the UE does not decode the message even if the UE receives the messages as many as the maximum number.

Figure 11:
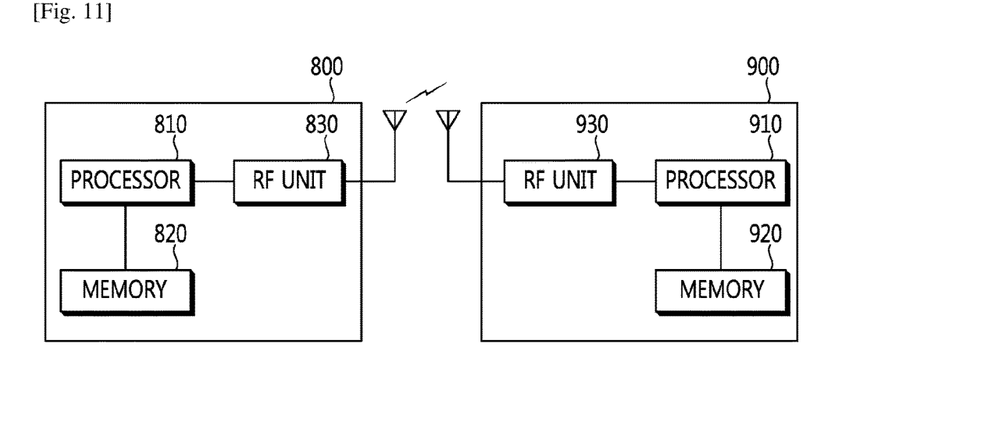
FIG. 11 shows a wireless communication system to implement an embodiment of the present invention.

FIG. 11 shows a wireless communication system to implement an embodiment of the present invention.

An entity of a network 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for performing, by a user equipment (UE), a random access procedure in a wireless communication system, the method comprising:
   receiving a mapping table between a number of repetitions required for correct reception of a downlink message and an estimated number of repetitions for uplink transmissions from a network;
   determining a required amount of repetitions for uplink transmissions during a random access procedure based on the number of repetitions required for correct reception of the downlink message according to the mapping table; and
   performing repetitions for uplink transmissions based on the determined required amount of repetitions for uplink transmissions.

2. The method of claim 1, wherein the downlink message is one of system information or a paging message.

3. The method of claim 1, wherein the uplink transmissions include transmission of preambles which are grouped.

4. The method of claim 3, wherein the preambles are grouped based on the number of repetitions for correct reception of downlink message.

5. A user equipment (UE) in a wireless communication system, the UE comprising:
   a radio frequency (RF) transceiver; and
   a processor that is coupled to the RF transceiver and that:
      controls the RF transceiver to receive a mapping table between a number of repetitions required for correct reception of a downlink message and an estimated number of repetitions for uplink transmissions from a network,
      determines a required amount of repetitions for uplink transmissions during a random access procedure based on the number of repetitions required for correct reception of the downlink message according to the mapping table, and
      controls the RF transceiver to perform repetitions for uplink transmissions based on the determined required amount of repetitions for uplink transmissions.

6. The UE of claim 5, wherein the downlink message is one of system information or a paging message.

7. The UE of claim 5, wherein the uplink transmissions include transmission of preambles which are grouped.

8. The UE of claim 7, wherein the preambles are grouped based on the number of repetitions for correct reception of downlink message.

* * * * *